United States Patent
Holmes (10) Patent No.: US 12,478,828 B2
(45) Date of Patent: Nov. 25, 2025

(54) TREADMILL PROVIDING MULTIPLE AXIS DISPLACEMENT OF THE MOVING SURFACE

(71) Applicant: Kendall Holmes, Christansted, VI (US)

(72) Inventor: Kendall Holmes, Christansted, VI (US)

( * ) Notice: Subject to any disclaimer, the term of this patent is extended or adjusted under 35 U.S.C. 154(b) by 0 days.

(21) Appl. No.: 17/313,961

(22) Filed: May 6, 2021

(65) Prior Publication Data
US 2021/0346752 A1   Nov. 11, 2021

Related U.S. Application Data

(60) Provisional application No. 62/704,368, filed on May 6, 2020.

(51) Int. Cl.
| | | |
|---|---|---|
| A63B 22/00 | (2006.01) | |
| A63B 22/02 | (2006.01) | |
| A63B 24/00 | (2006.01) | |

(52) U.S. Cl.
CPC ........ *A63B 22/0023* (2013.01); *A63B 22/025* (2015.10); *A63B 24/0075* (2013.01); *A63B 24/0087* (2013.01); *A63B 2225/09* (2013.01)

(58) Field of Classification Search
None
See application file for complete search history.

(56) References Cited

U.S. PATENT DOCUMENTS

| | | | | |
|---|---|---|---|---|
| 6,152,854 A | * | 11/2000 | Carmein | A63G 31/16 198/779 |
| 6,287,240 B1 | * | 9/2001 | Trabbic | A63B 22/02 482/54 |
| 7,101,318 B2 | | 9/2006 | Holmes | |
| 7,780,573 B1 | * | 8/2010 | Carmein | A63B 71/0622 482/4 |
| 9,050,493 B2 | | 6/2015 | Perez | |
| 9,433,819 B1 | * | 9/2016 | Carducci | A63B 22/0012 |
| 10,625,137 B2 | * | 4/2020 | Dalebout | A63B 22/0285 |
| 10,953,305 B2 | * | 3/2021 | Dalebout | A63B 22/0007 |
| 2004/0043873 A1 | * | 3/2004 | Wilkinson | A63B 21/00065 482/52 |
| 2004/0048722 A1 | * | 3/2004 | Epstein | G06F 3/011 482/54 |
| 2005/0266963 A1 | * | 12/2005 | Holmes | A63B 22/02 482/54 |
| 2009/0186746 A1 | * | 7/2009 | Pandolfo | A63B 71/023 482/7 |
| 2010/0304931 A1 | * | 12/2010 | Stumpf | A63B 24/0021 340/8.1 |

(Continued)

FOREIGN PATENT DOCUMENTS

| | | |
|---|---|---|
| CN | 203355211 U | * 12/2013 |
| CN | 104740829 A | * 7/2015 |

(Continued)

OTHER PUBLICATIONS

"CPSC Warns Consumers: Stop Using the Peloton Tread+", Release Date: Apr. 17, 2021, https://www.cpsc.gov/Newsroom/News-Releases/2021/CPSC-Warns-Consumers-Stop-Using-the-Peloton-Tread.

*Primary Examiner* — Shila Jalalzadeh Abyaneh
(74) *Attorney, Agent, or Firm* — Michael A. Whittaker (57) ABSTRACT

A treadmill exercise apparatus which accommodates displacement of the moving treadmill deck about the vertical axis and the longitudinal axis, and optionally about the lateral axis, simultaneously.

13 Claims, 8 Drawing Sheets

(56) References Cited

U.S. PATENT DOCUMENTS

| | | | | |
|---|---|---|---|---|
| 2013/0225371 A1* | 8/2013 | Harrer | ............... | A63B 21/4015 |
| | | | | 482/8 |
| 2015/0080181 A1* | 3/2015 | Skulman | ........... | A63B 24/0075 |
| | | | | 482/3 |
| 2015/0352396 A1* | 12/2015 | Dalebout | .............. | A63B 22/02 |
| | | | | 482/54 |
| 2016/0059068 A1* | 3/2016 | Olson | ................ | A63B 22/0235 |
| | | | | 482/54 |
| 2016/0287929 A1* | 10/2016 | Poole | ................ | A63B 21/0552 |
| 2019/0307982 A1* | 10/2019 | Brodsky | ................ | A61H 3/008 |
| 2019/0336827 A1* | 11/2019 | Intonato | ............. | A63B 71/0622 |
| 2020/0179789 A1* | 6/2020 | Fima | ................. | A63B 24/0087 |
| 2020/0254311 A1* | 8/2020 | Watterson | .......... | A63B 24/0087 |

FOREIGN PATENT DOCUMENTS

| | | | | | |
|---|---|---|---|---|---|
| CN | 205539719 U | * | 8/2016 | | |
| CN | 106340065 A | * | 1/2017 | ........... | G06T 19/006 |
| CN | 107193234 A | * | 9/2017 | ......... | G05B 19/0423 |
| CN | 109876369 A | * | 6/2019 | | |
| CN | 109876370 A | * | 6/2019 | | |
| CN | 110755807 A | * | 2/2020 | ............. | A63B 22/02 |
| DE | 202011101454 U1 | * | 8/2011 | ....... | A63B 23/03575 |
| KR | 20190143273 A | * | 12/2019 | ............... | G09B 9/00 |
| TW | M536959 | * | 2/2017 | | |
| TW | M536959 U | * | 2/2017 | | |
| WO | WO-2016153442 A1 | * | 9/2016 | ......... | A63B 22/0087 |

\* cited by examiner

TREADMILL PROVIDING MULTIPLE AXIS DISPLACEMENT OF THE MOVING SURFACE

The present application claims the benefit of U.S. Provisional Application No. 62/704,368 entitled "TREADMILL PROVIDING MULTIPLE AXIS DISPLACEMENT OF THE MOVING SURFACE", filed May 6, 2020, from which priority is claimed and which is hereby incorporated by reference in its entirety.

FIELD OF THE INVENTION

The present invention relates to treadmill exercise apparatuses.

BACKGROUND OF THE INVENTION

The following discussion of the background of the invention is merely provided to aid the reader in understanding the invention and is not admitted to describe or constitute prior art to the present invention.

Balance is the ability to maintain the body's center of mass over its base of support. A properly functioning balance system allows humans to see clearly while moving, identify orientation with respect to gravity, determine direction and speed of movement, and make automatic postural adjustments to maintain posture and stability in various conditions and activities. Balance is achieved and maintained by a complex set of sensorimotor control systems that include sensory input from vision (sight), proprioception (touch), and the vestibular system (motion, equilibrium, spatial orientation); integration of that sensory input; and motor output to the eye and body muscles.

Agility activities are often used to improve lower extremity coordination, speed, and quickness, especially to determine an athlete's ability to coordinate sprinting, deceleration, and changing direction safely and effectively. Such coordination encompasses proprioception and balance abilities as the nervous system and musculoskeletal system interact to prevent injury during cutting, pivoting, and jumping activities.

Agility exercise routines can include activities on balance boards, slide boards, use of resistance bands, treadmill activities such as retro-walking, side shuffle, and cariocas, and hopping and jumping activities. Trainers may monitor these activities for features such as maintenance of center of mass over a base of support, jumping to targets, range of motion, balance, etc., and can adjust a training plan to improve an individual's performance or to assist in injury recovery.

A standard treadmill provides a moving deck which continuously moves away from a podium which typically provides controls and a set of handrails to assist with balance. It is recommended that treadmill users look forward, as looking down or to the side increases the chance of a fall. In this orientation, the podium can provide a visual sensory context for maintaining proprioception and balance. In certain exercises, such as side shuffle, a conventional treadmill must be utilized in a manner contrary to this conventional use. A user stands in a side-ways position on the platform of a treadmill (e.g., so that the podium is situated either to the left or right of the user, depending upon which sideways direction the user is standing), and then operates the treadmill platform. The user then performs a side-to-side striding technique whereby he or she is essentially walking sideways on the treadmill platform.

U.S. Pat. No. 7,101,318 discloses an exercise device incorporating a treadmill platform and treadmill podium, whereby the user may walk or run on the treadmill, not only in the forward direction, but also in the side-to-side and backwards directions described above, while still facing the podium. In this patent, the moving treadmill deck can be rotated with respect to the platform, so that regardless of the direction of travel in which the user is traveling on the platform (forward, side-to-side, or backwards), the user will always be facing the podium.

SUMMARY OF THE INVENTION

It is an object of the present invention to provide a treadmill exercise apparatus which accommodates displacement of the moving treadmill deck about the vertical axis and the longitudinal axis, and optionally about the lateral axis, simultaneously. The treadmill exercise apparatus of the present invention permits the user to both rotate and tilt the treadmill deck to a desired position for use while maintaining a position facing forward on the treadmill apparatus during exercise.

In a first aspect, the invention relates to a treadmill exercise apparatus, comprising:
- a deck platform comprising a longitudinal axis, a lateral axis, and a vertical axis;
- a support platform supporting the deck platform;
- a tread belt operably connected to a drive motor, the drive motor causing continuous movement of the belt along the longitudinal axis to provide a moving deck on the upper surface of the deck platform;
- a first actuator configured to introduce yaw motion of the deck platform such that the longitudinal axis of the deck platform rotates about the vertical axis and the moving deck is thereby displaced relative to the support platform;
- a second actuator configured to introduce roll motion of the deck platform such that the lateral axis of the deck platform rotates about the longitudinal axis and the moving deck is thereby displaced relative to the support platform;
- wherein the first and second actuators are configured and arranged such that the deck platform accommodates displacement of the moving deck about the vertical axis and the longitudinal axis simultaneously.

In certain embodiments, an actuator comprises a motor or a driven link which is operably connected to the deck platform to impart a controlled movement to the deck platform relative to the support platform. The term "driven link" as used herein refers to an apparatus such as a hydraulic cylinder or screw which provides a motive force, while a "motor" refers to a device that transforms electrical energy into mechanical energy. In preferred embodiments, the mechanical energy is rotational, and may be operably coupled to the deck platform via an axle, via a gear train, etc. Other actuators known in the art include pneumatic actuators, solenoids, magnetic actuators, cams, electro-mechanical actuators, telescoping actuators, etc. This list of actuators is exemplary in nature and is not meant to be limiting.

The first actuator is configured and arranged to impart a yaw rotation of the deck platform relative to the support platform. "Yaw rotation" refers to a rotational movement about a vertical axis of a body. In certain embodiments, this yaw rotation can be freely controlled through any angle, or may be controlled in steps so that the deck platform may be positioned at specific predetermined angles (for example, 0°, 45°, 90°, 135°, 180°, 225°, 270°, 315°, in each case as measured clockwise with 0° meaning no rotation relative to the support platform). In preferred embodiments, the yaw rotation can be adjusted both clockwise or counterclockwise under the control of the user.

The second actuator is configured and arranged to impart a roll rotation of the deck platform relative to the support platform. "Roll rotation" refers to a rotational movement about a longitudinal axis of a body. In certain embodiments, this roll rotation can be from −55° to +55° or any rotation therebetween, in each case with positive rotation being measured clockwise facing the front of the treadmill deck and with 0° meaning no roll relative to the support platform. The second actuator can comprise one or more individual motors, driven links, etc., acting in concert to provide the roll rotation. By way of example, a single motor may be operably coupled to a central axle running along the longitudinal axis of the deck platform such that rotation of the axle creates a roll rotation. Alternatively, driven links at each corner of the deck platform may be employed, where two driven links on the same lateral side lift that lateral side. This is not meant to be limiting.

The treadmill exercise apparatus of the invention preferably comprises a controller operably connected to the first and second actuators, and to the motor driving the moving deck surface. The controller is configured to accept input data for controlling speed of the moving deck and yaw and roll motion of the deck platform, for example by providing buttons that control the amount and direction of yaw and tilt motion, and most preferably includes a display unit which provides a visual indication of yaw and tilt motion, for example in degrees, and speed of the moving deck surface, for example in pace per distance (e.g., minutes per mile) and/or distance per unit time (e.g., miles per hour).

In certain embodiments, the controller comprises a processor and a digital storage medium operably connected to the processor, wherein the storage medium stores the input data as instructions executable by the processor for controlling speed of the moving deck and yaw and roll motion of the deck platform. In preferred embodiments, the controller is operably connected to a digital communication network to receive the input data from a data server at a remote location, e.g., via an internet connection between the controller and the data server.

In various embodiments, the treadmill exercise apparatus of the invention can comprise a display or audio system which can display audio and/or video synchronized to the instructions. By way of example, the audio and/or video sent across the digital communication network can depict a second person performing the choreographed exercise routine on a second treadmill exercise apparatus at a remote location. In this manner, a virtual (archived) or live trainer can be demonstrating the choreographed exercise routine to the user as a means of encouragement or guidance. Alternatively, or together with the virtual or live trainer, other owners of other compatible treadmills can "meet up" for joint exercises or to provide a virtual exercise class. In preferred embodiments, the treadmill exercise apparatus can receive instructions through the digital communication network that cause the speed of the moving deck and yaw and roll motion of the deck platform to change in accordance with the choreographed exercise routine without further user input.

In various embodiments, the processor of the treadmill exercise apparatus can be operably connected to a display screen operably which displays a graphical user interface displaying real-time and/or archived choreographed exercise routines available from the data server. This display screen can be part of the treadmill exercise apparatus itself, or can be on a separate computing device such as a smart phone or a tablet computing device which accesses the users account on the remote data server. Selection of a particular exercise routine on the separate computing device can be communicated to the treadmill exercise apparatus upon selection, and then run at the convenience of the user.

In certain embodiments, the display screen, whether on the treadmill exercise apparatus itself or on a separate computing device such as a smart phone or a tablet computing device can be configured to display a second graphical user interface displaying performance parameters derived from performance of the choreographed exercise routine by user of the the treadmill exercise apparatus. This can depict, for example, calories burned, number of repetitions completed, a comparison to results from other owners of other compatible treadmills, etc.

In preferred embodiments, the second actuator may be further configured to impart a pitch motion to the deck platform such that the longitudinal axis of the deck platform rotates about the lateral axis and the moving deck is thereby displaced relative to the support platform, wherein the first and second actuators are configured and arranged such that the deck platform accommodates displacement of the moving deck about the lateral axis, the vertical axis, and the longitudinal axis. In certain embodiments, the tilt rotation can be from −55° to +55°, in each case with positive rotation being measured clockwise with the front of the treadmill deck being to the right and with 0° meaning no tilt relative to the support platform. By way of example, if the second actuator comprises a network of individually controlled motors (or driven links, etc). at each corner of the deck platform, two motors at the front of the deck platform can lift the front (creating a negative tilt rotation), and at the same time two motors positioned at the same side of the deck platform can lift that side. In this manner, the deck platform may be controlled along all three (yaw, roll, and pitch) axes simultaneously.

In certain embodiments of the invention, the treadmill exercise apparatus further comprises a plurality of anchor points on the deck platform suitable for attaching accessories to be used during an exercise session or routine. Examples of such accessories include resistance bands, body support harnesses, etc. This list is not meant to be limiting. Such anchor points may include one or more that are configured and arranged on the treadmill exercise apparatus such that the one or more anchor points remain in a fixed orientation relative to the deck platform during yaw and roll motions of the deck platform and so are in a constant location relative to the treadmill surface during an exercise session or routine. In addition, or in the alternative, one or more of the plurality of anchor points may be configured and arranged on non-rotating/non-tilting portions of the treadmill exercise apparatus such that they do not follow the treadmill surface.

In certain embodiments of the invention, the treadmill exercise apparatus further comprises a display system configured to project visual cues in the form of visible light onto the ground surrounding the treadmill exercise apparatus or onto the treadmill exercise apparatus. Examples of such visual cues are described hereinafter.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

Figure 1:
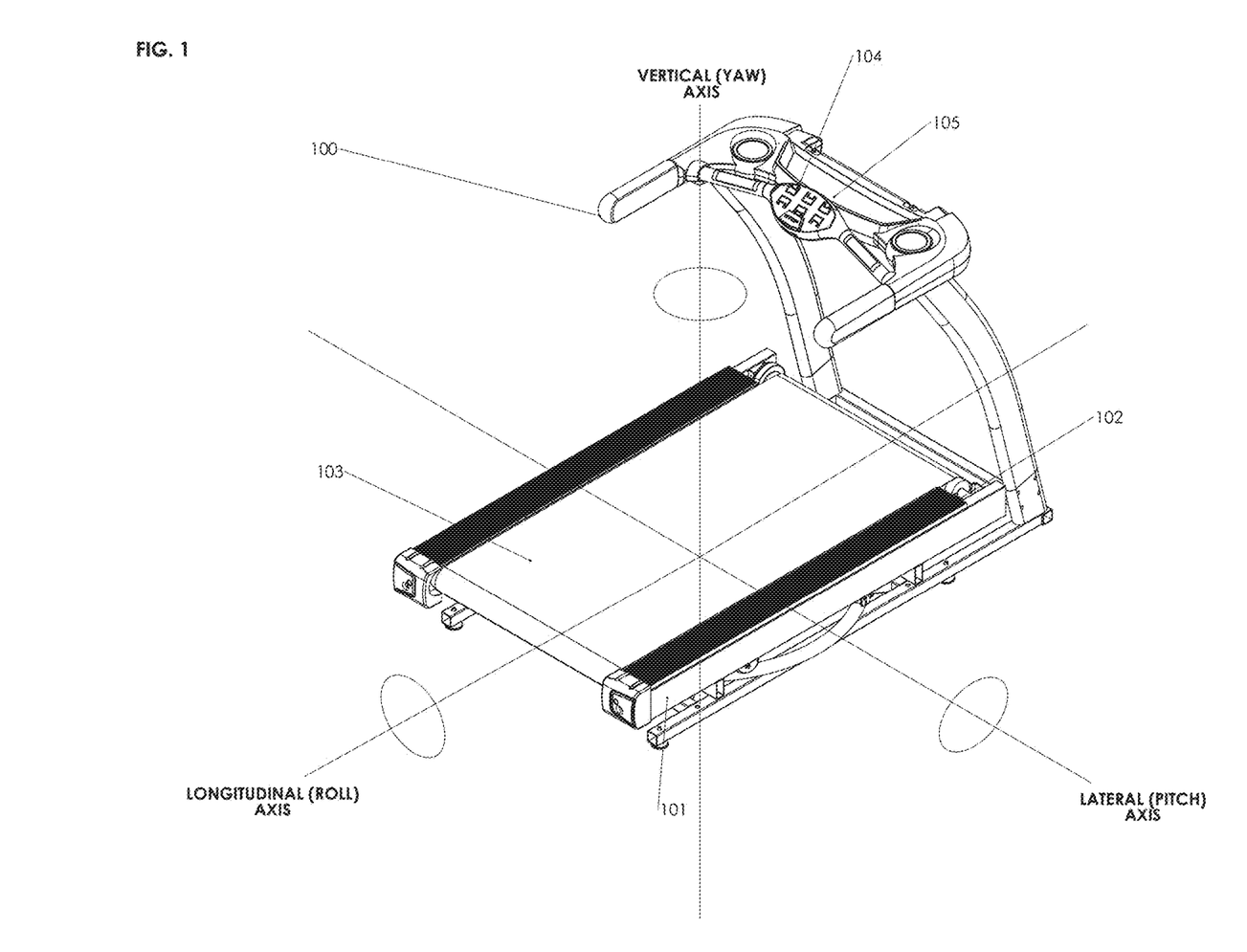
FIG. 1 depicts a treadmill exercise apparatus showing the vertical (yaw), longitudinal (roll) and lateral (pitch) axes of the deck platform.

FIG. 1 depicts a treadmill exercise apparatus 100 that comprises a support platform 101 and a deck platform 102 positioned on the support platform. Deck platform 102 comprises a continuous tread belt 103 operably connected to a drive motor, the drive motor causing continuous movement of the belt along the longitudinal axis to provide a moving deck on the upper surface of the deck platform that moves from front-to-back as is conventional in a typical treadmill. A user console includes a controller keypad 104 and screen 105 to provide a mechanism for user input for control of the treadmill.

The vertical (yaw) axis depicts an axis around which deck platform 102 can rotate relative to support platform 101. This rotation is preferably bi-directional, in that the controller can be used to rotate deck platform 102 in either a clockwise or counterclockwise direction. Yaw rotation of deck platform 102 about the perimeter support platform 101 can be achieved using numerous force generating elements as described hereinafter. The deck platform 102 can be pivoted to any position relative to the support platform 101.

Similarly, the longitudinal (roll) axis depicts an axis around which deck platform 102 can rotate relative to support platform 101 to create a side-to-side longitudinal incline to deck platform 102. In FIG. 1 this axis is depicted along the center line of deck platform 102. In this embodiment, the deck platform 102 can be pivotally connected along a central longitudinal axle. The actuator mechanism comprises one or more driven links operably connected to a first side of deck platform 102, and one or more driven links operably connected to a second side of deck platform 102. As driven links extend on the first side, the roll of the deck platform changes. Likewise, as driven links extend on the second side, the roll of the deck platform changes. In some examples, driven links extend on one side while driven links on the other side are simultaneously retracted to create the desired amount of roll.

In other examples, the driven links are controlled to adjust the elevation of just one side of the deck platform at a time. In this embodiment, the longitudinal roll axis is moved to the side of the deck platform which does not elevate.

In a like manner, the lateral (pitch) axis depicts an axis around which the deck platform 102 can rotate relative to support platform 101 to create a front-to-back lateral incline to deck platform 102. In FIG. 1 this axis is depicted along the center line of deck platform 102. In this embodiment, the deck platform 102 can be pivotally connected along a central lateral axle. The actuator mechanism comprises one or more driven links operably connected to the front end of deck platform 102, and one or more driven links operably connected to the back end of deck platform 102. As driven links extend on the front end, the pitch of the deck platform changes. Likewise, as driven links extend on the rear end, the pitch of the deck platform changes. In some examples, driven links extend on end while driven links on the end are simultaneously retracted to create the desired amount of pitch.

In other examples, the driven links are controlled to adjust the elevation of just one end of the deck platform at a time. In this embodiment, the lateral pitch axis is moved to the end of the deck platform which does not elevate.

It will be apparent from this description that, by placing the driven links of the actuator mechanism to the corners (or to each edge) of the deck platform, one can control both roll and pitch simultaneously by controlling the height of each corner (or each edge) independently of the others.

Preferably, changes about a tilt/yaw/roll axis are limited to a velocity that does not induce a loss of balance. For example, changes about an axis are 60°/second or less, more preferably 30°/second or less, and in certain embodiments 10°/second or less. In certain embodiments (e.g., when changes of >10°/second are employed) changes about an axis, the acceleration and/or deceleration of the velocity may be damped so as to prevent abrupt perturbations in translation of the platform.

Figure 2A:
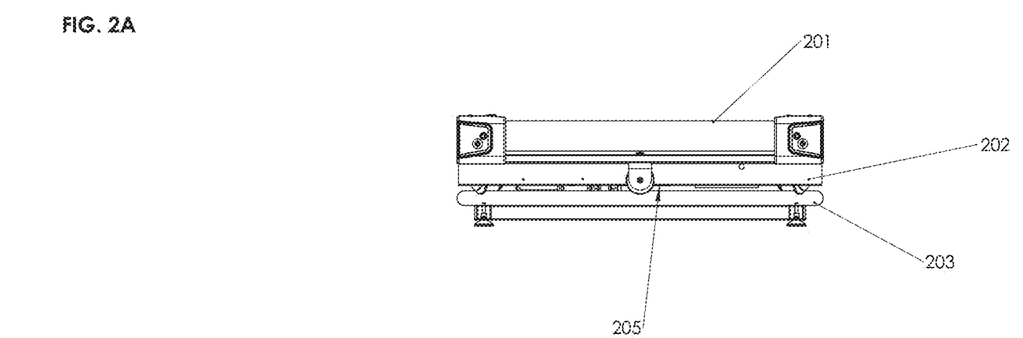
FIG. 2A depicts the relationship of the deck platform to the support platform in the absence of tilt or rotation.
Figure 2B:
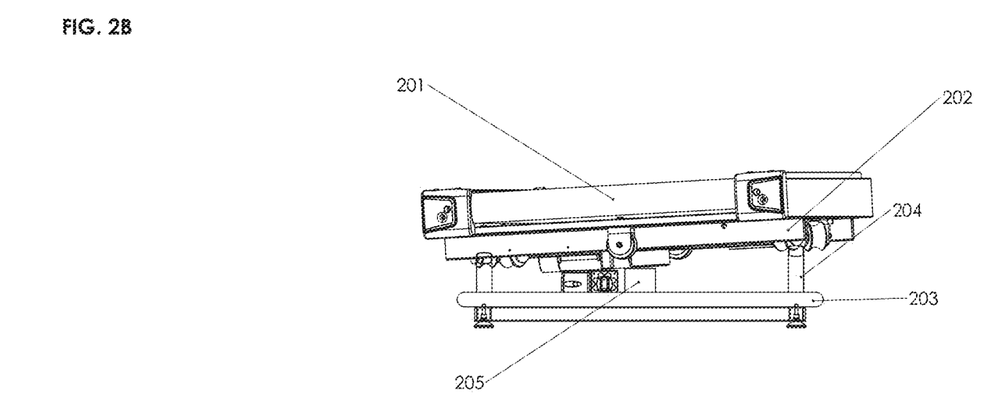
FIG. 2B depicts the relationship of the deck platform to the support platform following tilting of the deck platform.

FIG. 2A depicts a rear view of a treadmill exercise apparatus 200 of the invention in a simplified form. The support platform 203 is operably connected to the deck platform which is comprised of a deck platform support member 202 and a running deck 201 to provide both yaw and roll simultaneously. For purposes of yaw, a motor 205 attached to support platform 203 through a motor spindle imparts rotational motion to deck platform support member 202. For purposes of roll, driven links 204 attached to deck platform support member 202 extend and retract as shown in FIG. 2B to provide the desired amount of roll to running deck 201. Extending both driven links 204 would in turn provide a desired amount of pitch to running deck 201.

Figure 3A:
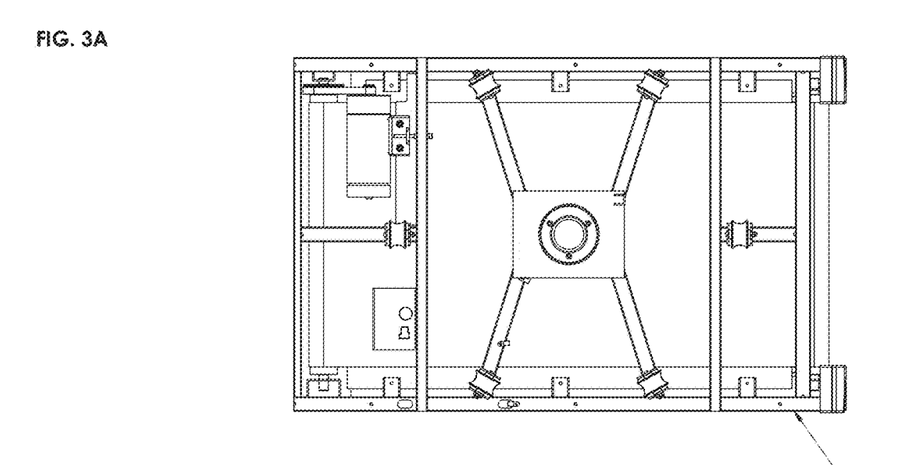
FIG. 3A depicts the top surface of an exemplary deck platform support member, showing the locations at which the support member is connected to the second actuator driven links (not pictured) for imparting roll, and optionally pitch, motion to the running deck of the deck platform.
Figure 3B:
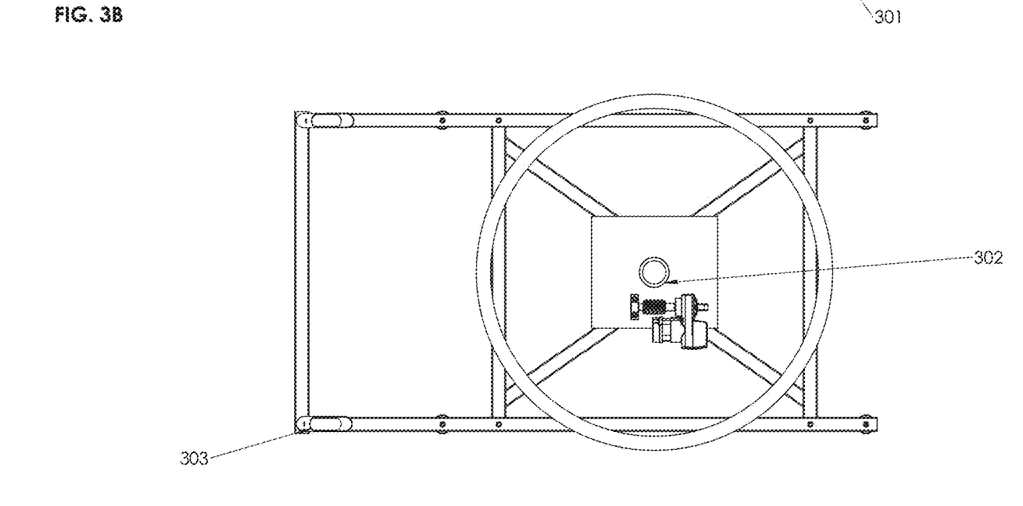
FIG. 3B depicts the lower surface of the exemplary deck platform support member, showing the location at which the support member is connected to the first actuator (not pictured) for imparting yaw motion to the deck platform.

FIGS. 3A and B depict the attaching location 302 for the motor on the bottom aspect of deck platform support member 301, and the corner attaching locations 303 for driven links on the top aspect of deck platform support member 301. One of skill in the art will understand that this arrangement may be reversed, in that the motor may be attached on the top aspect of deck platform support member 301 and the corner attaching locations 303 for driven links on the bottom aspect of deck platform support member 301, and the system will function in a like manner.

Any appropriate type of actuator may be used in accordance with the principles described herein. For example, a non-exhaustive list of actuators that may be used as the first or second actuator includes rotational electric motors, screw actuators, hydraulic actuators, pneumatic actuators, solenoids, magnetic actuators, cams, electro-mechanical actuators, telescoping actuators, other types of actuators, or combinations thereof. Further, the actuators may be powered with a motor, compressed gas, electricity, magnetic fields, other types power sources, or combinations thereof. Further, the actuators may also have the ability to yaw, roll, and tilt the running deck to any appropriate angle. Each actuator connection may include a pivot or universal joint so that the orientation of the actuators may accommodate changes in the orientation of the deck platform.

The controller for the treadmill exercise apparatus of the invention may include a combination of hardware and program instructions for executing the functions described herein. For example, the controller includes processing resources that are in communication with memory resources. The processing resources include at least one processor and other resources used to process programmed instructions that operate the treadmill exercise apparatus. The memory resources can be provided in the form of a memory capable of storing data such as programmed instructions or data structures used by the processor.

The memory resources may be a tangible and/or non-transitory computer readable storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, magnetic based memory, other types of memory, or combinations thereof.

The instructions can, when executed, cause the processing resources to perform a real-time and/or archived choreographed exercise routine based on user input. In some examples, the choreographed exercise routine is selected from a library. But, in other examples, the choreographed exercise routine is constructed based on the user's instructions. In this example, the constructed routine may be added to the library for later retrieval. The attributes of the routine may include the appropriate rotations, inclines, declines, and lateral tilts that are associated with each portion of the choreographed exercise routine.

In some examples, the processing resources and the memory resources are located within the treadmill itself. Alternatively, treadmill processing resources may be in communication with a data server over a network. In this regard, the data structures, such as the libraries, may be accessed from a remote location over a network connection. Thus, the elevation control instructions may be implemented on the treadmill, a mobile device, a fitness tracking device, a remote exercise simulation device, an electronic tablet, a wearable computing device, a head mounted device, a server, a collection of servers, a networked device, a watch, or combinations thereof. This implementation may occur through input mechanisms, such as push buttons, touch screen buttons, voice commands, dials, levers, other types of input mechanisms, or combinations thereof.

Resistance band walks are a common and popular tool in personal training, strength and conditioning, and injury recovery. Resistance running and walking involves the use of resistance bands with one end attached to the body and the other to a fixed anchor point as a means of introducing progressive resistance. The term "anchor point" as used herein refers to a dedicated location on the treadmill exercise apparatus that is configured to receive one or more accessory elements for use during an exercise routine. Various types of anchor points are known in the art in the form of hooks, loops, rails, threaded inserts, etc. See, e.g., U.S. Pat. No. 9,050,493, which is hereby incorporated by reference in its entirety.

Figure 4:
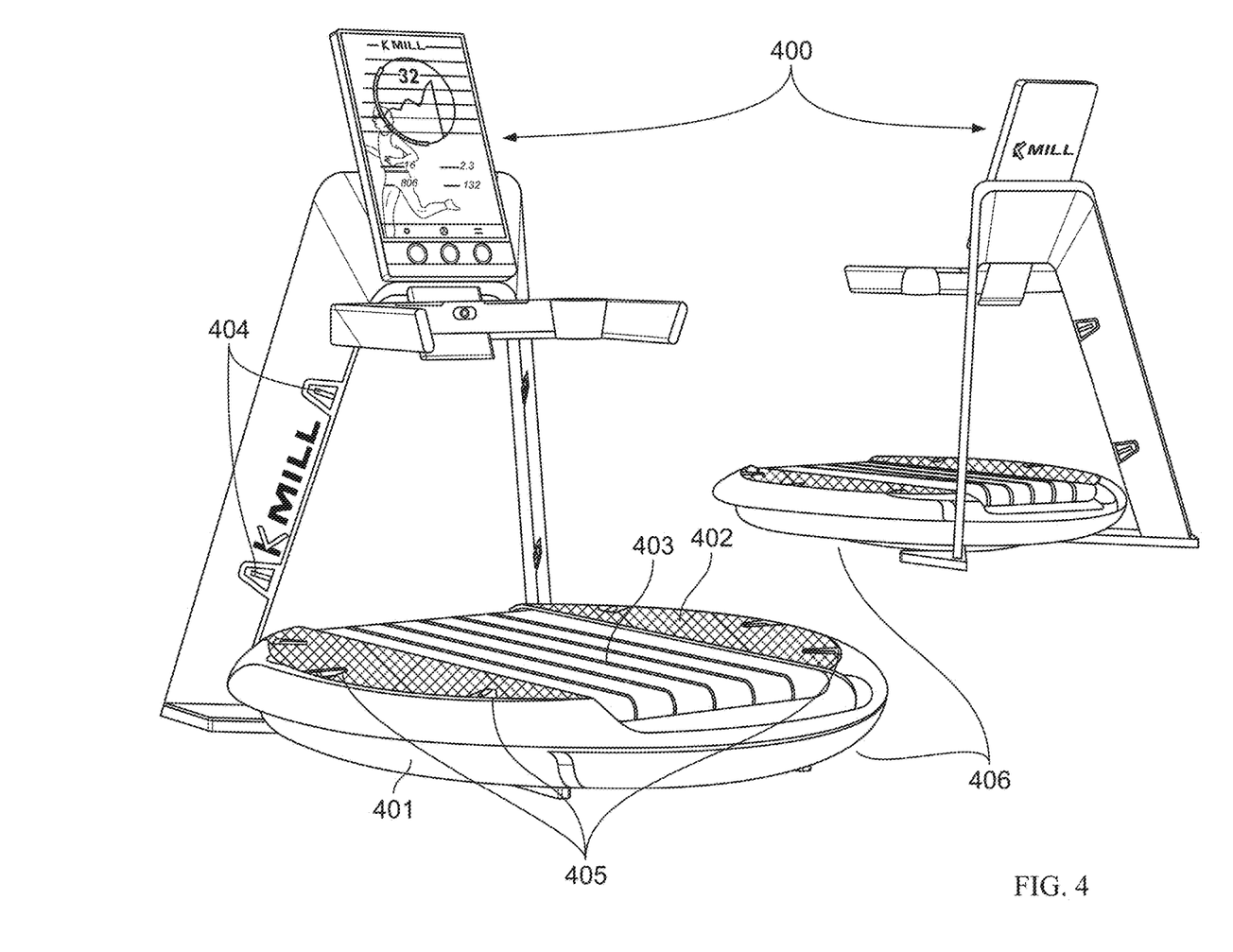
FIG. 4 depicts two views of an exemplary treadmill exercise apparatus of the invention.
Figure 8:
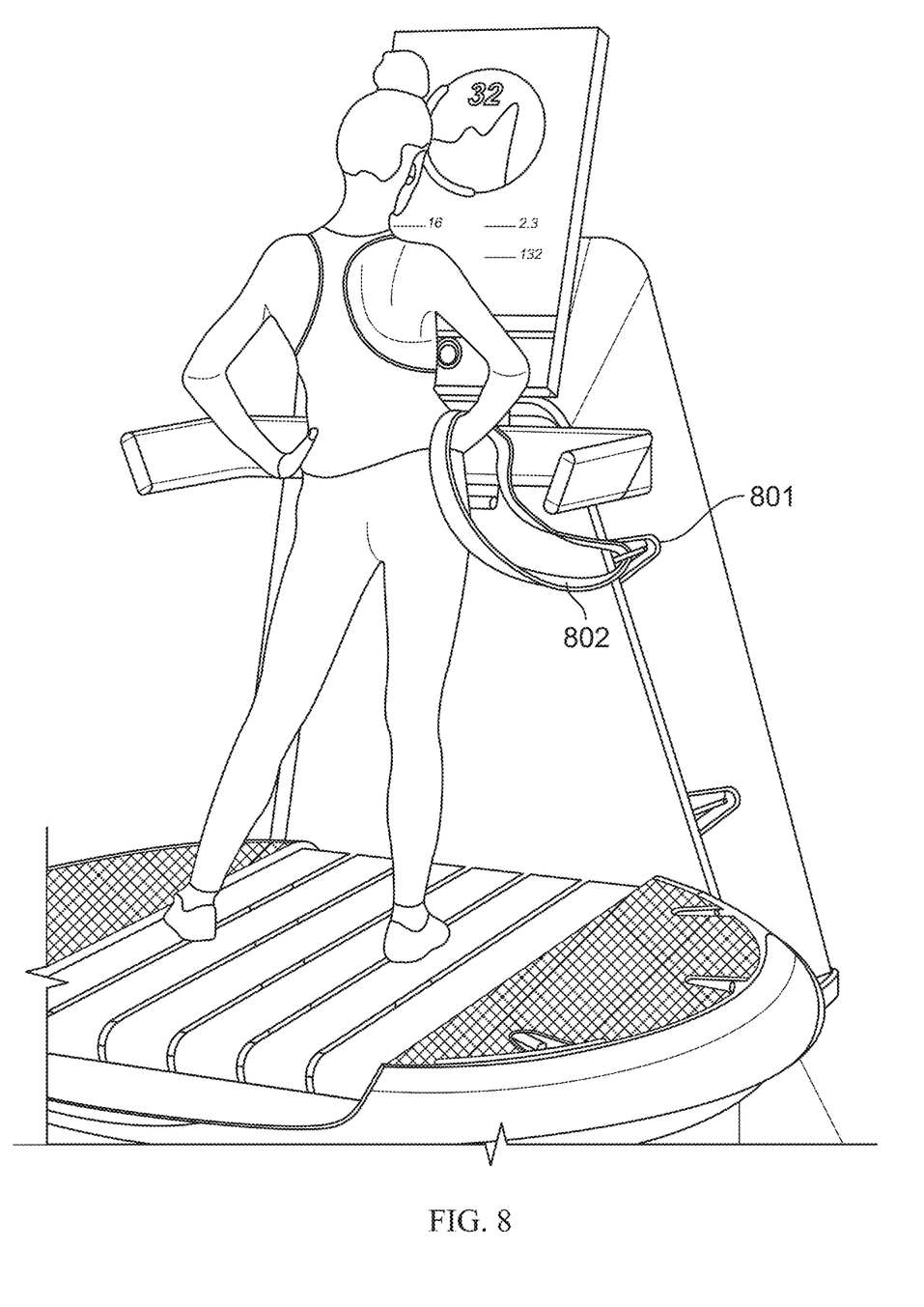
FIG. 8 depicts an exemplary treadmill exercise apparatus of the invention showing an example of an accessory exercise band attached to the apparatus at an anchor point.

FIG. 4 depicts two views of an exemplary treadmill exercise apparatus 400 of the present invention in which deck platform 402 is configured to rotate around support platform 401, while tread belt 403 provides a moving deck on the upper surface of the deck platform. Dedicated anchor points 404 and 405 are provided to attach accessories such as resistance bands, body supports, etc. FIG. 8, depicts the attachment of a resistance band 802 to one such anchor point 801 for exemplary purposes. It is noted that anchor points 404 may be provided on non-rotating/non-tilting portions of the treadmill exercise apparatus, while anchor points 405 may be provided on portions of the treadmill exercise apparatus that rotate and/or tilt with the moving deck so that these anchor points 405 remain in a fixed orientation relative to the deck platform during yaw and roll motions of the deck platform.

Figure 5:
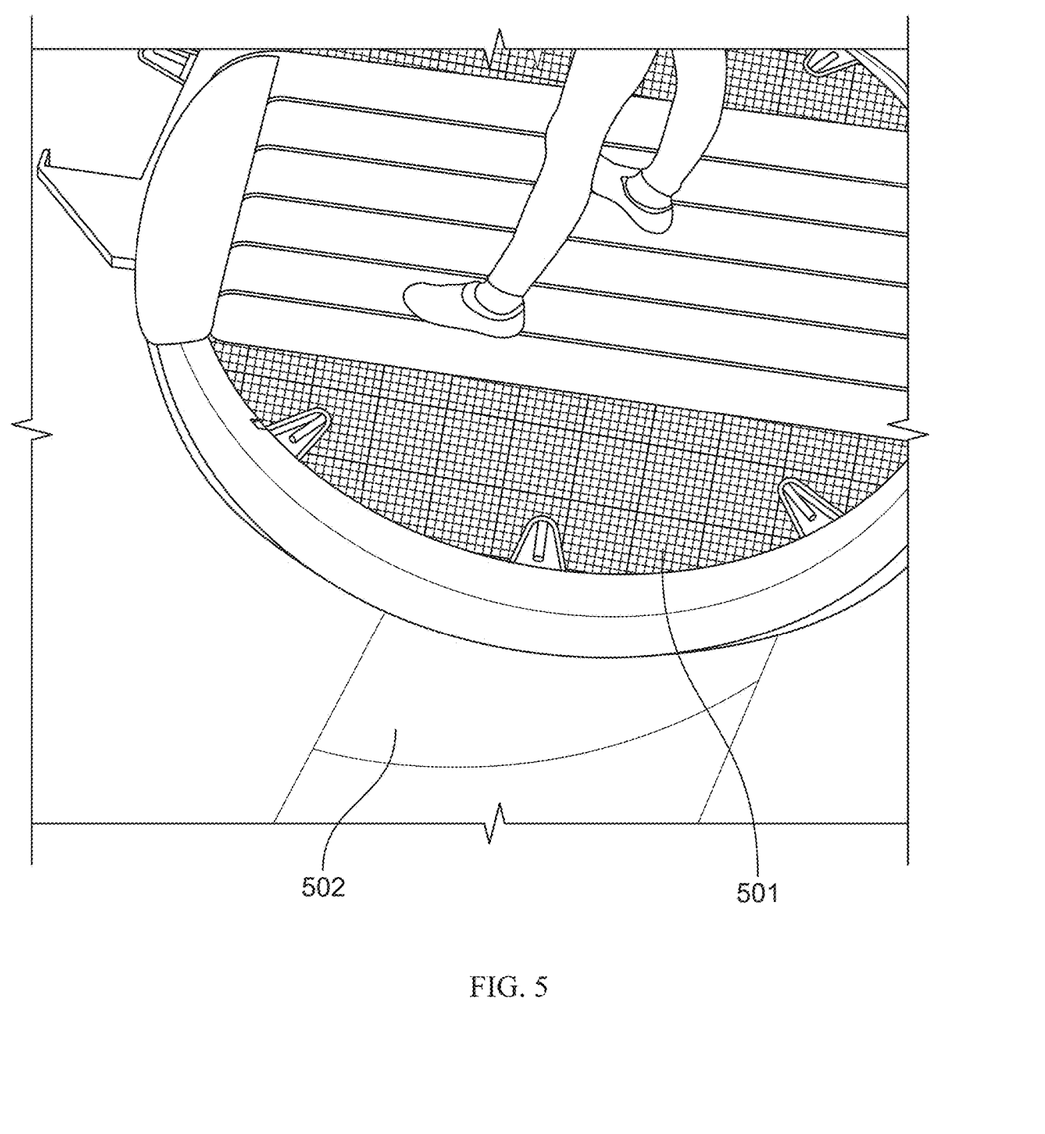
FIG. 5 depicts the upper surface of a deck platform of the exemplary treadmill exercise apparatus shown in FIG. 4 configured to provide projected lighting effects.
Figure 6:
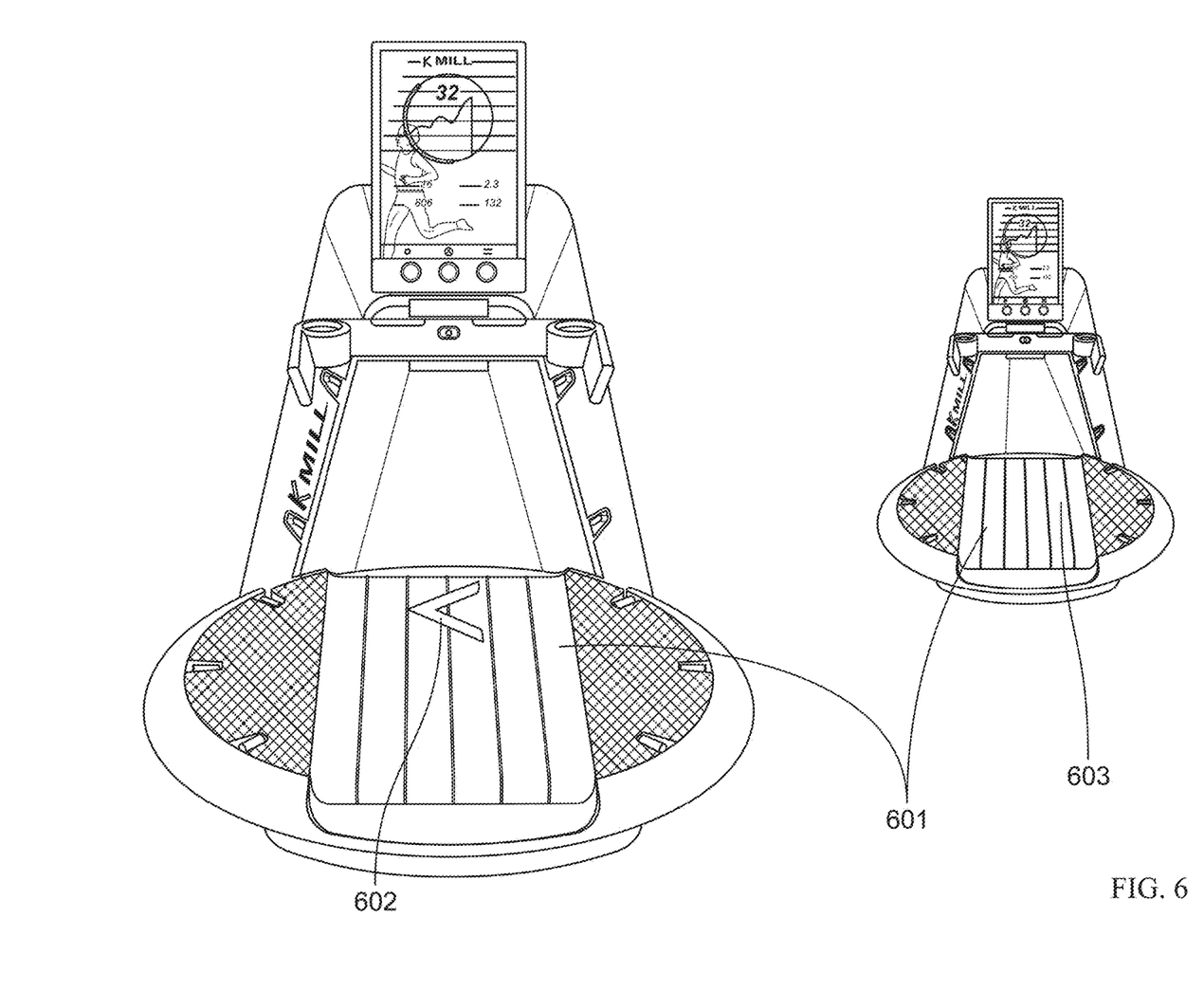
FIG. 6 depicts two views of an exemplary treadmill exercise apparatus of the invention configured to provide projected lighting effects.

Additionally, the treadmill exercise apparatus may further comprise a display system to provide various visual cues to the user, and to individuals (e.g., trainers) that are observing the user. These visual cues may come in the form of visible light 406 projected from the treadmill exercise apparatus either onto the ground surrounding the treadmill exercise apparatus or onto the treadmill exercise apparatus itself. For example, the lighting may be varied in shape, size, brightness, color, etc., in a manner to indicate a feature of the treadmill exercise apparatus or an exercise routine. In FIG. 5, an example is depicted where brightness and shape of lighting 502 is used to indicate a counterclockwise rotation of deck platform 501. In FIG. 6, lighting is used to project an arrow 602 onto deck platform 601 to indicate a direction of rotation, or to highlight footwork 603 during an exercise routine.

Figure 7:
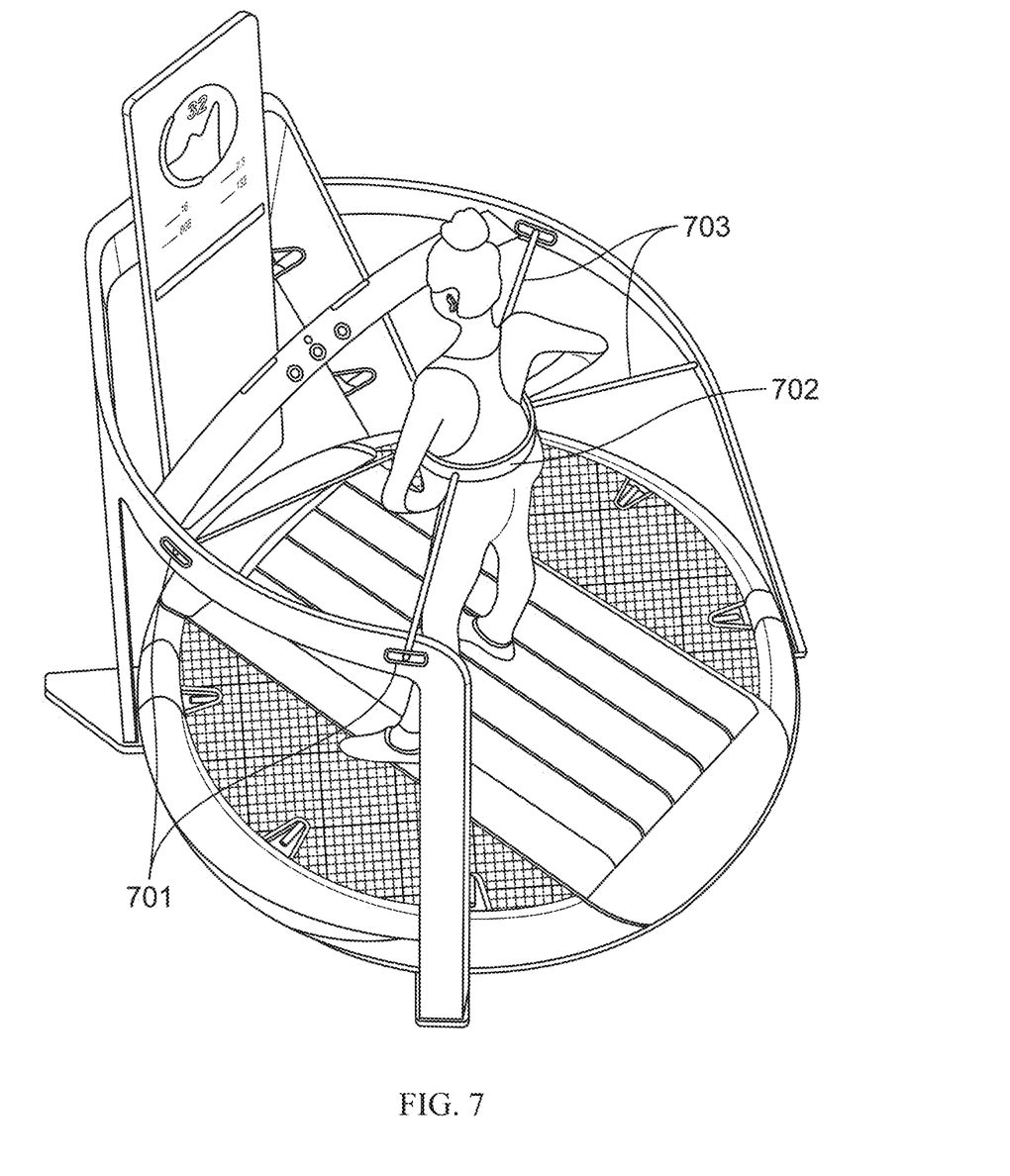
FIG. 7 depicts an exemplary treadmill exercise apparatus of the invention comprising a harness support for the user.

As the deck platform of the treadmill exercise apparatus both rotates and tilts, certain users may require additional balance support. FIG. 7 depicts the use of the anchor points 701 to provide support for a balance accessory in the form of a support harness 702. This harness may be loosely positioned around a user and attached with rigid supports 703; or as a body weight support system in which supports 703 are biasing cords suspendable between the anchor points and the support harness mechanism. The action of the biasing cords gently counter balances the natural weight of the user, thereby unloading a selected portion of the weight of the user, while also dampening both vertical and lateral forces exerted on the suspended user while standing or exercising on treadmill.

The treadmill exercise apparatus may also be equipped with one or more display screens, cameras, microphones, and speakers or other audio outputs. These devices may be mounted directly to the treadmill exercise apparatus or otherwise placed within the viewing area of the user. Because the user remains in a single orientation facing the screen as the moving deck surface rotates around various axes, these devices remain within the user's visual field. Preferably, at least one display screen is integrated into or attached to the treadmill exercise apparatus, and is positioned in front of the user generally centered on the control console.

The display screen may provide a user input device such as a touchscreen, touchpad, or other device. The display screen may be any size, but optimally is large enough and oriented to allow the display of a range of information including one or more video streams, a range of performance metrics for the user and others, and a range of different controls. In various exemplary embodiments the user can use a touchscreen or other interface to selectively present a range of different information on the screen including live and/or archived video, performance data, and other user and system information. The user interface can provide a wide range of control and informational windows that can be accessed and removed individually and/or as a group by a click, touch, or gesture. In various exemplary embodiments, such windows may provide information about the user's own performance and/or the performance of other participants in the same class both past and present.

The user interface can be used to access member information on a remote server, login and logout of the remote system, and access live content such as live exercise classes and archived content. User information may be displayed in a variety of formats and may include historical and current performance and account information, social networking links and information, achievements, etc. The user interface can also be used to access the system to update profile or member information, manage account settings such as information sharing, and control device settings.

A user interface may be presented on the display screen to allow the user to manage their experience, including selecting information to be displayed and arranging how such information is displayed on their system. The user interface may present multiple types of information overlaid such that different types of information can be selected or deselected easily by the user. For example, performance information may be displayed over video content using translucent or partially transparent elements so the video behind the information elements can be seen together with the information itself.

As noted above, in certain embodiments the user can select among both live and archived content. For example, if the user selects scheduled classes, they may be presented with a screen showing the schedule of upcoming classes. The user interface allows users to select future classes or to start a class that is underway or about to begin. The class schedule may be presented in any suitable format, including calendar, list, or any other appropriate layout.

In various exemplary embodiments, if the user selects archived classes, they may be presented with a screen showing available archived classes sorted by any appropriate category. Thumbnails or icons representing archived classes may be displayed in any suitable format, and may include information on how many times the user has ridden that class in the past or other performance or class-related information. A class may be accessed by selecting a particular thumbnail or icon.

When a class is being playing on the display screen 104 through the user interface 200, in various exemplary embodiments the primary video feed may be shown as the background video full-screen or in a sub-window on the screen. Information elements may be provided on different parts of the display screen to indicate any performance metrics, including elapsed time, time left, distance, speed, resistance, heart rate, respiration, hydration, calorie burn, and/or any custom performance scores that may be developed. The displayed information may also include the trend or relationship between different performance metrics. For example, the display can indicate a particular metric in a color that indicates current performance compared to average performance for a class or over time, such as red to indicate that current performance is below average or green to indicate above average performance. Trends or relative performance can also be shown using color and graphics, such as a red down arrow to show that current performance is below average.

In various exemplary embodiments the user interface may also present one or more video streams from a range of different sources. For example, one video stream may be the live or archived class content shown in the primary window, while one or more additional video streams may be displayed in other windows on the screen display. The various video streams may include live or recorded streaming instructor video or any other video content, including one or more live video chat streams. The user interface may also provide additional windows that can be used to display a range of content including additional performance data, information about the class, instructor, etc., or secondary video streams. Such additional windows can allow the user to see a range of information regarding other current or past participants to compare performance, and open or close voice or video chat streams or other communication channels.

The following are preferred embodiments of the invention:

Embodiment 1. A treadmill exercise apparatus, comprising:
a deck platform comprising a longitudinal axis, a lateral axis, and a vertical axis;
a support platform supporting the deck platform;
a tread belt operably connected to a drive motor, the drive motor causing continuous movement of the belt along the longitudinal axis to provide a moving deck on the upper surface of the deck platform;
a first actuator configured to introduce yaw motion of the deck platform such that the longitudinal axis of the deck platform rotates about the vertical axis and the moving deck is thereby displaced relative to the support platform;
a second actuator configured to introduce roll motion of the deck platform such that the lateral axis of the deck platform rotates about the longitudinal axis and the moving deck is thereby displaced relative to the support platform;
wherein the first and second actuators are configured and arranged such that the deck platform accommodates displacement of the moving deck about the vertical axis and the longitudinal axis simultaneously.

Embodiment 2. A treadmill exercise apparatus according to Embodiment 1, further comprising a controller operably connected to the first and second actuators, wherein the controller is configured to accept input data for controlling speed of the moving deck and yaw and roll motion of the deck platform.

Embodiment 3. A treadmill exercise apparatus according to Embodiment 2, wherein the controller comprises a processor and a digital storage medium operably connected to the processor, wherein the storage medium stores the input data as instructions executable by the processor for controlling speed of the moving deck and yaw and roll motion of the deck platform.

Embodiment 4. A treadmill exercise apparatus according to Embodiment 3, wherein the controller is operably connected to a digital communication network to receive the input data from a data server at a remote location.

Embodiment 5. A treadmill exercise apparatus according to one of Embodiments 3 or 4, wherein the treadmill further comprises audio and/or video synchronized to the instructions.

Embodiment 6. A treadmill exercise apparatus according to one of Embodiments 3-5, wherein the instructions cause the speed of the moving deck and yaw and roll motion of the deck platform to perform a choreographed exercise routine.

Embodiment 7. A treadmill exercise apparatus according to Embodiment 6, wherein the audio and/or video depict a second person performing the choreographed exercise routine on a second treadmill exercise apparatus at a remote location.

Embodiment 8. A treadmill exercise apparatus according to Embodiment 7, wherein the treadmill exercise apparatus and the second treadmill exercise apparatus simultaneously perform the choreographed exercise routine in real-time.

Embodiment 9. A treadmill exercise apparatus according to Embodiment 7, wherein the second person is an archived performance of the predetermined exercise routine and the treadmill exercise apparatus performs the choreographed exercise routine in synchrony with the archived performance.

Embodiment 10. A treadmill exercise apparatus according to one of Embodiments 4-9, further comprising a display screen operably connected to the processor to display a graphical user interface displaying real-time and/or archived choreographed exercise routines available from the data server.

Embodiment 11. A treadmill exercise apparatus according to Embodiment 10, wherein the display screen is operably connected to the processor to display a second graphical user interface displaying performance parameters derived from performance of the choreographed exercise routine by the treadmill exercise apparatus.

Embodiment 12. A treadmill exercise apparatus according to one of Embodiments 1-11, wherein the second actuator is further configured to introduce pitch motion of the deck platform such that the longitudinal axis of the deck platform rotates about the lateral axis and the moving deck is thereby displaced relative to the support platform, wherein the first and second actuators are configured and arranged such that the deck platform accommodates displacement of the moving deck about the lateral axis, the vertical axis, and the longitudinal axis simultaneously.

Embodiment 13. A treadmill exercise apparatus according to one of Embodiments 1-12, further comprising a plurality of anchor points on the deck platform.

Embodiment 14. A treadmill exercise apparatus according to Embodiment 13, wherein one or more of the plurality of anchor points are configured and arranged on the treadmill exercise apparatus such that the one or more anchor points remain in a fixed orientation relative to the deck platform during yaw and roll motions of the deck platform.

Embodiment 15. A treadmill exercise apparatus according to Embodiment 13 or 14, wherein one or more of the plurality of anchor points are configured and arranged on non-rotating/non-tilting portions of the treadmill exercise apparatus.

Embodiment 16. A treadmill exercise apparatus according to one or more of Embodiments 1-15, further comprising a display system configured to project visual cues in the form of visible light onto the ground surrounding the treadmill exercise apparatus or onto the treadmill exercise apparatus.

One skilled in the art readily appreciates that the present invention is well adapted to carry out the objects and obtain the ends and advantages mentioned, as well as those inherent therein. The examples provided herein are representative of preferred embodiments, are exemplary, and are not intended as limitations on the scope of the invention.

While the invention has been described and exemplified in sufficient detail for those skilled in this art to make and use it, various alternatives, modifications, and improvements should be apparent without departing from the spirit and scope of the invention. The examples provided herein are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

It will be readily apparent to a person skilled in the art that varying substitutions and modifications may be made to the invention disclosed herein without departing from the scope and spirit of the invention.

All patents and publications mentioned in the specification are indicative of the levels of those of ordinary skill in the art to which the invention pertains. All patents and publications are herein incorporated by reference to the same extent as if each individual publication was specifically and individually indicated to be incorporated by reference.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Other embodiments are set forth within the following claims.

I claim:

1. A treadmill exercise apparatus, comprising:
a substantially circular deck platform comprising a longitudinal axis, a lateral axis, and a vertical axis;
a support platform supporting the deck platform;

a tread belt operably connected to a drive motor, the drive motor causing continuous movement of the belt along the longitudinal axis to provide a substantially rectangular moving deck on an upper surface of the deck platform;

a first plurality of anchor points on the deck platform positioned laterally to the moving deck and configured and arranged such that the first plurality of anchor points remain in a fixed orientation relative to the moving deck;

a second plurality of anchor points on the support platform such that the second plurality of anchor points are on non-rotating/non-tilting portions of the treadmill exercise apparatus;

a first actuator configured to introduce yaw motion of the deck platform such that the longitudinal axis of the deck platform rotates about the vertical axis and the moving deck is thereby displaced relative to the support platform;

a second actuator configured to introduce roll motion of the deck platform such that the lateral axis of the deck platform rotates about the longitudinal axis and the moving deck is thereby displaced relative to the support platform; and a display system configured to project visual cues in the form of visible light onto a ground surrounding the treadmill exercise apparatus, wherein the first and the second actuators are configured and arranged such that the deck platform accommodates displacement of the moving deck about the vertical axis and the longitudinal axis simultaneously.

2. The treadmill exercise apparatus according to claim 1, further comprising a controller operably connected to the first and the second actuators, wherein the controller is configured to accept input data for controlling a speed of the moving deck and the yaw and the roll motions of the deck platform.

3. The treadmill exercise apparatus according to claim 2, wherein the controller comprises a processor and a digital storage medium operably connected to the processor, wherein the storage medium stores the input data as instructions executable by the processor for controlling the speed of the moving deck and the yaw and the roll motions of the deck platform.

4. The treadmill exercise apparatus according to claim 3, further comprising audio and/or video synchronized to the instructions.

5. The treadmill exercise apparatus according to claim 4, wherein the instructions cause the speed of the moving deck and the yaw and the roll motions of the deck platform to perform a choreographed exercise routine.

6. The treadmill exercise apparatus according to claim 5, wherein the treadmill exercise apparatus is a first treadmill exercise apparatus, and wherein the audio and/or video depict a person performing the choreographed exercise routine on a second treadmill exercise apparatus at a remote location.

7. The treadmill exercise apparatus according to claim 6, wherein the first treadmill exercise apparatus and the second treadmill exercise apparatus simultaneously perform the choreographed exercise routine in real-time.

8. The treadmill exercise apparatus according to claim 6, wherein the audio and/or video depict an archived performance of the choreographed exercise routine and the first treadmill exercise apparatus performs the choreographed exercise routine in synchrony with the archived performance of the choreographed exercise routine.

9. The treadmill exercise apparatus according to claim 3, wherein the controller is operably connected to a digital communication network to receive the input data from a data server at a remote location.

10. The treadmill exercise apparatus according to claim 9, further comprising a display screen operably connected to the processor to display a first graphical user interface displaying real-time and/or archived choreographed exercise routines available from the data server.

11. The treadmill exercise apparatus according to claim 10, wherein the display screen is operably connected to the processor to display a second graphical user interface displaying performance parameters derived from performance of a real-time or an archived choreographed exercise routine by the treadmill exercise apparatus.

12. The treadmill exercise apparatus according to claim 1, wherein the second actuator is further configured to introduce pitch motion of the deck platform such that the longitudinal axis of the deck platform rotates about the lateral axis and the moving deck is thereby displaced relative to the support platform, wherein the first and the second actuators are configured and arranged such that the deck platform accommodates displacement of the moving deck about the lateral axis, the vertical axis, and the longitudinal axis simultaneously.

13. The treadmill exercise apparatus according to claim 1, wherein the display system is further configured to project visual cues in the form of visible light onto the treadmill exercise apparatus.

* * * * *